United States Patent [19]

Sahakian

[11] Patent Number: 4,877,923
[45] Date of Patent: Oct. 31, 1989

[54] SENSORS FOR DETECTING AND LOCATING LIQUID LEAKS

[75] Inventor: Jack A. Sahakian, Flagstaff, Ariz.

[73] Assignee: W. L. Gore & Associates, Inc., Newark, Del.

[21] Appl. No.: 233,305

[22] Filed: Aug. 17, 1988

Related U.S. Application Data

[63] Continuation-in-part of Ser. No. 226,644, Aug. 1, 1988, abandoned.

[51] Int. Cl.⁴ .................. H01B 7/32; H01G 7/00; G01M 3/16
[52] U.S. Cl. .................. 174/11 R; 73/40.5 R; 174/110 FC; 174/115
[58] Field of Search ............ 174/11 R, 110 FC, 115; 73/40, 40.5 R; 200/61.04, 61.05; 324/519, 525, 533, 534; 340/604, 605; 361/280, 284, 285, 286

[56] References Cited

U.S. PATENT DOCUMENTS

| 3,981,181 | 9/1976 | Ochiai | 73/40.5 R |
| 4,029,889 | 6/1977 | Mizuochi | 174/11 R |
| 4,095,174 | 6/1978 | Ishido | 174/11 R X |
| 4,206,402 | 6/1980 | Ishido | 73/40.5 R X |
| 4,206,632 | 6/1980 | Suzuki | 73/40.5 R |
| 4,594,638 | 6/1986 | Suzuki et al. | 174/11 R |

Primary Examiner—Laramie E. Askin
Attorney, Agent, or Firm—Gary A. Samuels

[57] ABSTRACT

A sensor cable for detecting and locating liquid chemicals, especially hydrocarbons, and/or water leaks without interruption of the system, wherein two or three conductors and appropriate insulation are arranged in a configuration that provides circuits for detecting and locating liquid chemicals and for detecting and locating liquid water.

14 Claims, 1 Drawing Sheet

SENSORS FOR DETECTING AND LOCATING LIQUID LEAKS

CROSS REFERENCE TO RELATED APPLICATIONS

This application is a continuation in-part of application Ser. No. 226,644, filed Aug. 1, 1988, and having the title of Sensor for Detecting and Locating Water and Liquid Chemical Leaks and now abandoned.

FIELD OF THE INVENTION

The present invention relates to electrical liquid leak detector cables for detecting and locating liquid chemical product leaks, especially hydrocarbon products, and/or water, particularly from pipelines or storage tanks.

BACKGROUND OF THE INVENTION

Storage or pipeline leaks of hydrocarbon and other chemical products can cause contamination of ground water. Conversely, water leaking into storage tanks and pipelines can cause contamination. There is a need for detection of leaks during storage and pipe transportation of liquid chemical products such as oils, crude oil, refined petroleum products, gasoline, kerosene, organic solvents and the like. In addition, a device to detect water that might leak into electrical equipment is desirable.

One method of detection has been to run a pair of conductors along underground oil or chemical pipelines using insulation between the conductor wires that allows permeation of chemicals. On leakage from a pipe, the chemicals enter the insulation causing the electrical characteristics between the conductors to change. By using time domain reflectometry (TDR) pulse reflecting electronic means, an electrical pulse is sent into the conductor and the reflected wave of the pulse is observed. Any changes in the characteristic impedance of the cable due to a change in the dielectric constant of the insulation is recorded and the location determined.

There is a need for devices that can detect and locate not only multiple leaks of hydrocarbon products and other chemical products but also leaks of water, exactly and continuously over long distances. There is a need to detect and locate such hydrocarbons and chemicals and/or water in one cable construction without shorting the circuit, thus enabling the detection and location of multiple leaks.

SUMMARY OF THE INVENTION

The devices of this invention operate through detection of a change in the characteristic impedance of a circuit caused by a change in the dielectric of insulative materials between circuit conductors.

In one embodiment, the cable assembly employs one circuit and is used for detecting leaks of water or water solutions. In a second embodiment, two circuits are employed, one for detecting non-conductive liquid chemicals, and one for detecting water and water solutions. The circuits are arranged such that contact and sensing of leaks will not affect continued operation of the circuit, or in the case of the two-circuit embodiment, operation of both circuits.

One sensor device of this invention comprises a first, a second and a third electrical conductor arranged substantially parallel with each other, one such conductor comprising a core, or primary, conductor that is separated from a second fluid-permeable conductor construction, preferably a braided conductor, by a first porous insulation that is porous to non-conductive chemicals such as hydrocarbons or organic solvents. The set of first and second conductors comprises one circuit of the cable construction of the invention. The second conductor is separated from a third fluid-permeable conductor construction by two layers of insulation, one (the second insulation layer) being porous to chemicals, particularly hydrocarbon products, but non-porous to liquid water-based products. This insulation is preferably a hydrophobic microporous material. The other or third insulation layer allows both water and chemicals to permeate through it. The third conductor is a fluid-permeable conductor construction. A final insulating material covers all the other layers.

In operation, penetration of liquid chemical products, particularly hydrocarbon products, through all the layers to the first, primary, conductor causes the dielectric of the first porous insulation to change, thus causing the characteristic impedance of the first circuit to change without adversely affecting the operation of the second circuit. Likewise, water entering the porous material that makes the other or third insulation causes the dielectric of the insulation between the second and third conductors to change. As a result, a change in the characteristic impedance allows detection and location of leaks.

In another embodiment, that detects only water and water solutions, such as aqueous acidic or alkaline solutions, only two conductors are present. One is the core, or primary conductor. The other is a fluid-permeable conductor construction. The two are separated by insulation that is non-porous to liquid water but is permeable to liquid chemical products. Preferably it is a hydrophobic microporous insulation. Next to the hydrophobic insulation is a layer of insulation that is porous to liquid water. Surrounding all the layers is a final insulating layer.

DETAILED DESCRIPTION OF THE INVENTION

Figure 1:
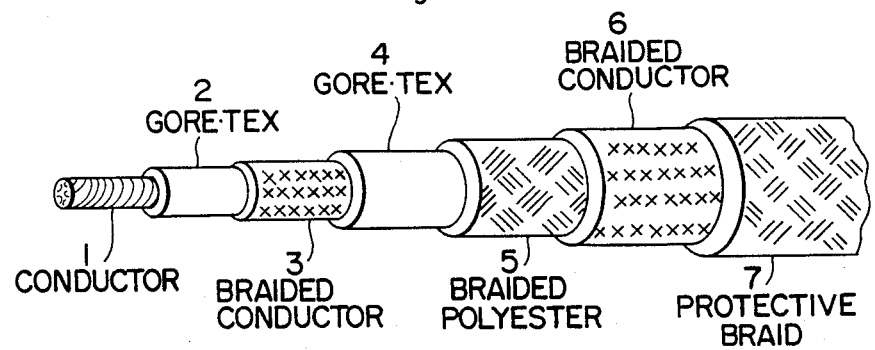
FIG. 1 is a perspective view, partly in section, of a first embodiment of a sensor cable according to the envention.

This invention uses time domain reflectometry (TDR) pulse reflectance to determine leaks of chemical products, especially hydrocarbon products, or water. Changes in the characteristic impedance of a cable due to changes in the dielectric constant of insulation between two conductors in a circuit are employed to discover and locate the leaks. In FIG. 1, a first core, or primary, conductor 1, which can be a solid copper wire, or a plated wire, or a stranded wire, is enclosed in a porous insulator 2. By "porous" herein is meant an insulator that is porous to liquid chemical products such as organic solvents, oils and petroleum products. Thus, insulation 2 can be a layer of polyolefin such as polyethylene or polypropylene, or can be a porous polytetrafluoroethylene. Preferably, insulation 2 is expanded, microporous polytetrafluoroethylene (EPTFE) in in the trade as "Gore-Tex". This material is described in U.S.

Pat. No. 3,953,566. This material is preferred because its porosity can be controlled during manufacture by varying the number of voids, thus enabling materials of varying porosity to be used as desired in a particular end-use. Insulation 2 can be applied to conductor 1 by any usual means. For example, it can be wrapped around conductor 1 in the form of a tape; or, it can be extruded onto the wire of conductor 1. In the case of the preferred insulation, EPTFE, it can be applied as a porous sintered tape or by paste extruding PTFE resin onto the wire and expanding and sintering it to achieve the requisite porosity and mechanical strength.

The second conductor 3 of the cable of this embodiment is fluid-permeable, thus allowing the passage of liquid chemicals, and particularly hydrocarbons. It is preferably made of a braided conductive metal construction. The construction can be made up of braided bundles of copper wire; braided bundles of copper wire and a porous material, such as the EPTFE described above; or of a conductive metal layer that has been perforated to provide porosity. Preferably the construction is made of braided bundles of copper wire and strands of EPTFE.

The first conductor 1 and the second conductor 2 make up the first circuit of this cable construction of the invention.

Surrounding the second conductor 2 is a second layer of insulation 4. This layer of insulation is porous to the chemicals as described above, and is also hydrophobic, i.e., it does not permit passage of liquid water. This insulative layer must therefore be selective in its porosity. Such materials can be microporous polyolefins such as polyethylene or polypropylene. Preferably however, this layer will be the same EPTFE described as for insulation layer 2.

Another layer of insulation 5 is applied to layer 4. Its purpose is to be porous, so as to pass chemicals on through to conductor 1; but this insulation layer is not hydrophobic. This layer allows permeation of liquid water so as to provide a change in dielectric constant between conductor 3 and conductor 6. Insulation 5 can be any porous liquid water permeable material such as polyester or polytetrafluoroethylene braid or woven material. Preferably it is a polyester braid construction.

Conductor 6 along with conductor 3 make up the second circuit of this cable construction of the invention. It can be any of the materials described for conductor 3, but preferably is the same as the preferred material of conductor 3.

Lastly, a protective overlayer of insulation 7 is provided. It is a porous, i.e. porous to chemicals, especially hydrocarbons, and water, material such as polyethylene or polyester, and can be woven, but preferably is braided or netted to aid in porosity and water permeability.

Stated alternatively, this invention, in one embodiment, comprises:

a sensor cable for detecting liquid leakage which comprises;

a first second and third electrical conductor, each in substantially parallel relation to each other, the first conductor being a primary or core conductor, said second and third conductors having a construction that is fluid-permeable so as to permit passage of liquid chemical products, particularly hydrocarbon products, a first insulation layer located between the first and second conductors, said first insulation being porous enough to permit passage of said liquid chemical products, a second insulation layer adjacent to and covering said second conductor, said second insulation being porous enough to permit passage of liquid chemical products, particularly hydrocarbon products or organic solvents, said second insulation being hydrophobic so that it is impermeable to liquid water.

a third insulation layer positioned between said second insulation layer and said third conductor, said third insulation layer being porous enough to permit passage of liquid chemical products, particularly hydrocarbon products, and being water permeable, a protective insulation cover that is porous enough to permit passage of liquid chemicals and water, said cover comprising the outer portion of the cable.

As explained above, hydrocarbon products of other chemical liquids are capable of penetrating through all the layers of the cable and will permeate into insulator 2. This results in a change in the dielectric constant of insulator 2 and a related change in the characteristic impedance of the first circuit. Water, on the other hand, will penetrate the outer layers 7, 6 and 5 of the cable and will cease its penetration when it reaches the hydrophobic insulation layer 4. As a result, the dielectric constant of the area between conductors 3 and 6 changes, allowing the electronic detection and location of a water leak. This is done without the shorting of the circuit between conductors 3 and 6 and enables the system to detect and locate multiple leaks along the length of the cable.

Figure 2:
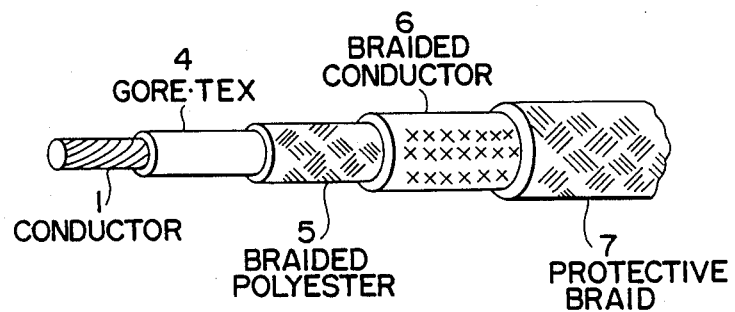
FIG. 2 is a perspective view, partly in section, of a second embodiment of a sensor cable according to the invention.

Referring now to FIG. 2, which depicts another embodiment of the invention, first primary core conductor 1, is surrounded by hydrophobic, microporous insulation 4. Insulation 5 surrounds insulation 4. Fluid-permeable conductor construction 6 surrounds insulation 5 and protective insulation 7 surrounds conductor construction 6. Elements 1, 4, 5, 6 and 7 are made of the same materials as elements 1, 4, 5, 6 and 7 of FIG. 1. This construction is commonly used for detection and location of liquid and water solution leaks.

The features of the cables of this invention are unique because they allow the same cable to detect and locate multiple chemical and/or water leaks through concurrent circuits within the same cable. In use, detection is made possible by laying the cable of this invention either along an underground pipeline or storage tank, an above ground pipeline or storage tank, or within the interstitial space of double walled pipes or tanks. Water vapor, usually in the form of humidity, is not detected by the cable circuitry because the dielectric constants of gases are too low (usually less than 1.03 Er) and, accordingly if present, will not have a measurable effect on the detection cable. After use, in most instances, the cable can be cleaned, stored and reused, as needed.

Typical non-conductive chemical products that can be sensed by derices of the invention include non-conductive solvents such as ketones, aromatic organic compounds, alcohols, chlorinated hydrocarbons, turpentine, and the like; vegetable oils, such as olive oil, soya oil, linseed oil, and the like; and non-conductive hydrocarbon products such as crude oils, gasoline, kerosene, diesel fuel and the like. Typical water solution and mixtures include salt solutions, acid solutions and alkaline solutions.

In one embodiment of the invention, conductor 1 was AWG 16 (19/29) nickel plated copper wire. Insulation 2 was made of EPTFE as described further above. The construction was about 0.135 inch in diameter.

Second conductor 3 was a braided combination of strands of AWG 38 nickel plated copper wire braid (50% nominal coverage).

Insulation 4 was of EPTFE as described immediately above.

Insulation 5 was a polyester braided thread.

Conductor 6 was the same as conductor 3.

Protective insulation 7 was made of the same material as insulation 5.

In use, because both detection of water and of oil operate on the basis of dielectric constant changes in insulation between conductors, leakage of chemicals or water into the cable of the invention does not disable the system, i.e., short the system, so as to prevent detection of further leaks at other areas along the cable.

I claim:

1. A sensor cable for detecting liquid leakage which comprises:

a first, second, and third electrical conductor, each in substantially parallel relation to each other, said first conductor being a core conductor, said second and third conductors having a fluid-permeable construction with permits passage of liquid chemicals, a first insulation layer located between the first and second conductors, said first insulation being porous enough to permit passage of liquid chemicals, a second insulation layer adjacent to and covering said second conductor, said second insulation being porous enough to permit passage of liquid chemicals, said second insulation being hydrophobic so that it is impermeable to liquid water, a third insulation layer positioned between said second insulation layer and said third conductor, said third insulation layer being porous enough to permit passage of liquid chemicals, and being water permeable, and a protective insulation cover that is porous enough to permit passage of liquid chemicals and water, said covering comprising the outer portion of the cable.

2. The cable of claim 1 wherein the first conductor comprises conductive metal, and each of the second and third conductors comprises a braid containing electrically conductive metallic wires.

3. The cable of claim 2 wherein the each braid is comprised of electrically conductive metallic wires braided with strands of a porous plastic material.

4. The cable of claim 1 wherein the first and second insulation layers are comprised of a microporous plastic polymer.

5. The cable of claim 4 wherein the microporous plastic polymer is expanded polytetrafluoroethylene.

6. The cable of claim 1 wherein the third insulation layer and the protective insulation cover comprise a thermoplastic material.

7. The cable of claim 6 wherein the thermoplastic material is polyester netting.

8. The cable of claim 1 wherein:

(a) the first conductor is a stranded or plated conductive metal, and each of the second and third conductors comprises a braid containing electrically conductive metallic wires;

(b) the first and second insulation layers are comprised of a microporous plastic polymer; and (c) the third insulation layer and the protective insulation cover comprise a thermoplastic material.

9. The cable of claim 8 wherein:

each braid is comprised of electrically conductive metallic wires braided with strands of a porous plastic material;

the microporous plastic polymer is expanded to polytetrafluoroethylene; and the thermoplastic material is a polyester netting.

10. A sensor cable for detecting liquid leakage which comprises:

a first and second electrical conductor each in substantially parallel relation to each other, said first conductor being a core conductor, said second conductor having a construction that is porous enough to permit passage of liquid chemicals, a first insulation layer adjacent to said first conductor, said insulation being porous enough to permit passage of liquid chemicals, said insulation being hydrophobic so that it is impermeable to liquid water, a second insulation layer positioned between said first insulation layer and said second conductor, said second insulation layer being water absorbent, and a protective insulation cover that is porous enough to permit passage of water, said cover comprising the outer portion of the cable.

11. The cable of claim 10 wherein the first conductor comprises conductive metal, and the second conductor comprises a braid containing electrically conductive metallic wires.

12. The cable of claim 11 wherein the braid is comprised of electrically conductive metallic wires braided with strands of a porous plastic material.

13. The cable of claim 10 wherein the first insulation layer is comprised of a microporous plastic polymer.

14. The cable of claim 13 wherein the microporous plastic polymer is expanded polytetrafluoroethylene.

* * * * *